United States Patent [19]

Yano et al.

[11] 4,235,528

[45] Nov. 25, 1980

[54] CERAMICS FOR ELECTROCHROMIC DISPLAY

[75] Inventors: Kohzo Yano, Tenri; Hiroshi Kuwagaki, Kyoto; Hiroshi Hamada, Tenri; Sadatoshi Takechi, Nara, all of Japan

[73] Assignee: Sharp Kabushiki Kaisha, Osaka, Japan

[21] Appl. No.: 32,493

[22] Filed: Apr. 23, 1979

Related U.S. Application Data

[63] Continuation of Ser. No. 760,521, Jan. 19, 1977, abandoned.

[30] Foreign Application Priority Data

Jan. 20, 1976 [JP] Japan ............... 51-6436

[51] Int. Cl.³ .................................... G02F 1/17
[52] U.S. Cl. ............................................ 350/357
[58] Field of Search ................... 350/357; 29/570

[56] References Cited

U.S. PATENT DOCUMENTS

| 3,892,472 | 7/1975 | Giglia | 350/357 |
| 4,021,100 | 5/1977 | Giglia | 350/357 |

*Primary Examiner*—James W. Davie
*Attorney, Agent, or Firm*—Birch, Stewart, Kolasch & Birch

[57] ABSTRACT

An electrochromic display comprising a display electrode and a counter electrode which form a cavity therebetween like a sandwich, the former consisting of a transparent conductive coating and a layer of transition metal oxide which varies reversibly in the light absorption spectrum upon application of current and the latter consisting of a conductive coating and a reversible charge exchange system. An electrolyte is injected into the cavity. A porous ceramics plate is positioned in contact with the display electrode and the counter electrode.

21 Claims, 1 Drawing Figure

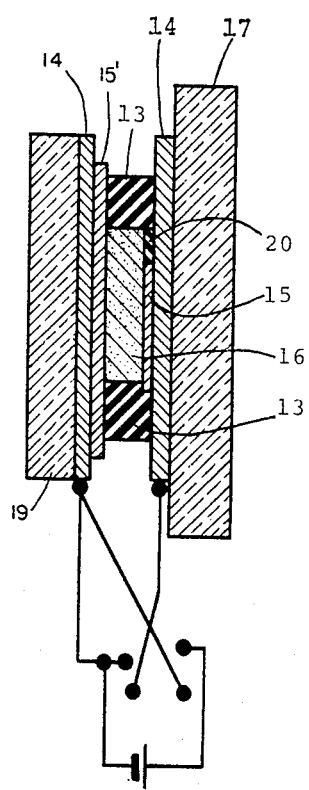

CERAMICS FOR ELECTROCHROMIC DISPLAY

This application is a continuation of copending application Ser. No. 760,521, filed on Jan. 19, 1977, now abandoned.

BACKGROUND OF THE INVENTION

The present invention relates to construction of an electrochromic display (hereinafter referred to as "ECD") containing a material of which the light absorption properties are reversibly varied in response to supply of the current, and an electrolyte. More particularly, the invention is concerned with an improvement in an ECD cell with a sandwich structure consisting of two support plates at least one of which is transparent.

It is well known that the electrolyte using ECD cells are classified into two groups. For example, there are one group using inorganic solid state thin layers (U.S. Pat. No. 2,319,765—Talmer, 1943) and another group using organic compounds such as halogens and halogen salts (U.S. Pat. No. 3,854,794-H. T. Van Dam et al., 1974). It was reported that the EC phenomenon in the former is such that, when the thin film is supplied with a negative potential with respect to the electrolyte, the formation of tungsten bronze is carried out by ion-electron double injections to obtain coloration and, when supplied with a positive potential with respect to the electrolyte, reactions opposite to the above are carried out to perform bleaching (B. W. Faughnan et al., RCA Rev. 36 (4), 177, 1975). In the latter, electrolytic reduction of halogen ions develops radical cations or radical ions so that coexisting halogen ions and salts are formed and deposited on the surfaces of electrodes. The resulting radical salts absorb visible light and, when oxidized, intend to take on the form of ions to dissociate per se. It was reported that such a redox system has a reversible nature (C. J. Shoot et al., Appl. Phys. Lett., 23 (2), 64, (1973)). By way of example, the inorganic thin films are discussed in the following description.

Diverse approaches have been suggested as to basic structure of ECD cells containing the electrolyte; the electrolyte is constituted by sulfuric acid gel (U.S. Pat. No. 3,708,220—M. D. Meyers, 1973; a counter electrode is established by EC material ($WO_3$) and graphite, pigment is dispersed within the gel electrolyte and a background is given to a visual display while concealing the counter electrode (U.S. Pat. No. 3,819,252, R. D. Giglia, 1974); background material which gives the background to a visual display and conceals the counter electrode, is constituted by a porous film of pigment solidified with adhesive (U.S. Pat. No. 3,892,472, R. D. Giglia, 1975).

Although as stated above considerable effort has been devoted to the development of solid state thin-film ECD cells which utilize the electrolyte as a source of ion supply, the development of these ECD cells still faces many practical problems. The first of the problems concerns solubility of the $WO_3$ film serving as the EC material into the electrolyte. If the sulfuric acid gel is employed as the ion supply source (as disclosed in the above referenced U.S. Pat. No. 3,708,220), then the evaporated $WO_3$ thin film will be dissolved after being exposed to a high temperature atmosphere of about 80 deg. C for about 72 hours, thereby causing the destruction of the ECD cells. A successful solution of that problem was attempted through a solution of lithium perchloride into R-butyrolacetone or propylene carbonate (U.S. Pat. No. 3,704,057, L. C. Beagle, 1972) or ethylene glycol derivatives, for example, 2 ethoxy ethyl acetate as suggested by the inventors et al. A high temperature exposure test was conducted upon these electrolytes at 80 deg. C for 2 months. They were all found to be favorable to the electrolytes for ECD cells because of the fact that nothing was found through elemental analysis of tungsten element in these solutions.

The second problem is predicated upon a method of giving the background to a visual display. It is normal to use displays against a specific background. However, the combination of the graphite or a conductive coating and the EC material is not good for the background, although to this end, the electrolyte used should assume a specific opague color (the above referenced U.S. Pat. No. 3,819,252). One approach for providing the background is to form a gel of the electrolyte mixed with pigment such as $TiO_2$ through the use of polyvinyl alcohol, etc. (The above referenced U.S. Pat. No. 3,819,252). However, the problem associated with the pigment containing electrolyte is that the pigment tends to coagulate and separate during preservation.

A film of pigment which is solidified with an adhesive while maintaining porosite, was suggested as an effective means for solving such a problem (U.S. Pat. No. 3,892,472). An example of a porous film is one containing a pigment solidified with an epoxy, while another example is a mixture of Teflon and a pigment squeezed to a thin film on a hot roll (this method is well known in the manufacture of a Teflon filter). Still another example is the paper making of pigment through an acrylic pulp. Since binders within these pigment containing porous films are organic compounds, they swell into the above discussed electrolyte solvents thereby destroying the porous film or weakening the mechanical strength.

The third and last problem concerns temperature resistance of the ECD cells. The ECD cells disclosed in the above patents are not able to tolerate expansion (an estimated ratio of about 10%) due to a temperature rise up to 50–100 deg. C during preservasion. This can be overcome by shortening a spacing between both electrodes, that is the display electrode and the counter electrode, and in other words reducing the volume of the electrolyte. However, provided that the spacing between both electrodes (thickness of the cells) is shortened, optical density of the pigment retaining background film will become smaller with the results that the shape of the counter electrode is caught by the viewer's eye therethrough. For example, the background film with the pigment content of 25 volume %, that is, the lowest limit capable of easily retaining the pigment, is not satisfactory as to opaqueness to serve as the background means unless its thickness is greater than 100μ. Meanwhile, an attempt to absorb expansion of the electrolyte due to a temperature rise of up to 50–100 deg. C only by "deflection" of a support plate (e.g. glass of about 1 mm thickness) is not successful because of a requirement that the ECD cell thickness be smaller than about 30 U. Further minimizing of the ECD cell thickness introduces a new problem of display electrode edge effects. Accordingly, it is an object of the present invention to provide cell structure for ECD cells capabling of providing an excellent background therefor and enhancing resistance against shocks caused by a temperature rise.

SUMMARY OF THE INVENTION

The present invention is implemented by preparing a pair of flat glass sheets of about 0.1–0.6 mm thickness and positioning a plate of ceramics in contact with a display electrode and a counter electrode within a cavity defined by pair of glass sheets. The plate of ceramics is optically opaque and has ionic conductivity because of its porosity.

More particularly, on one of the pair of glass sheets there is deposited a transparent, electrically conductive coating having a predetermined display pattern and a layer of EC material of the same shape as the predetermined display pattern to form the display electrode. An electrically conductive coating is deposited on the other of the pair of the glass sheets, the conductive coating being coated with a second EC layer to form the counter electrode. A previously prepared porous ceramic film of such as aluminum oxide (alumina) is held within the interior of the above discussed support scheme. Thus, the cavity which is established by the two electrodes holds and contacts the respective surfaces of the ceramics film. An electrolyte is injected into the cavity to complete the fabrication of an ECD cell.

The above discussed ceramic film optically shields the counter electrode and gives a good background to a visual display provided by the ECD cell and also affords enhanced mechanical strength to the EDC cell.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with the accompanying drawing, wherein:

The drawing is a cross-sectional view of one preferred form of the ECD cell implemented by the present invention.

DETAILED DESCRIPTION OF THE INVENTION

The ECD cell implemented with the present invention has a sandwich structure as shown in the drawing. Glass substrates 17 and 19 are flat glass sheets having a thickness of about 0.1 mm–0.6 mm, for example, commercially available thin plate glass by Matsunami Glass Industry Limited and micro sheet glass by Corning Glass Works. The glass substrate 17 carries a patterned transparent, electrically conductive coating 14 and a layer of electrochromatic material 15, in combination to form a display electrode. The optically transparent, electrically conductive coating 14 is obtainable through electron beam depositing of $SnO_2$ doped $In_2O_3$ or spraying with alcohol solution of $A_5Cl_5$ doped $SnCl_4$ onto the glass substrate when heated (as well known in the formation of a NASA film). The EC material (generally, $WO_3$) is deposited on the transparent conductive coating by a conventional technique such as an evaporation method and a sputtering method. A way to pattern the thus deposited films is to employ a positive type resist (for example, AZ 1350 by Shipley Co.) and to carry out light exposure and development so as to retain only a portion of the resist necessary for displaying purposes by a well known technique. Since the positive type resist is developed through the use of alkaline solution, the $WO_3$ film is etched concurrently with the development of the resist material. The transparent conducting coating can be etched or engraved by means of a mixture of ferric chloride and hydrochloric acid in case of $In_2O_3$ and by means of nascent hydrogen due to alkali metal and mineral acid in case of $SnO_2$ (NESA film). For the positive type resist, separation is carried out by acetone, etc. without damaging the $WO_3$. On the contrary in the case where a negative type resist (for example, KMER by Kodak Co.) is used, separation requires a stripper containing phenol as its major component. This implies that the negative resist is invalid for the manufacture of the $WO_3$ film ECD cells. It will be noted that a portion of the transparent conducting coating is not overlaid with EC material, that is, a terminal leading region is coated with an electrically insulating film (for example $SiO_2$).

Similarly, the other of the glass substrates 19 has a thickness of 0.1–0.6 mm, which carries an electrically conductive coating 14 made of a Pt·Pd deposited film or a carbon film (for example, Everyohm No. 30 by Nippon Carbon Co.) or the above discussed $In_2O_3$ film or $SnO_2$. The conductive coating 14 is not necessarily transparent. The conductive layer 14 is overlaid with the EC material 15 to complete the establishment of the counter electrode. A sealing spacer denoted as 13 is set up by a glass sheet of 0.1–1.0 mm thick or a Mylar sheet. An example of a sealing resin is an epoxy resin (for example, R'2401-HC 160 by Somal Co.).

The key to the present invention is the use of a porous ceramic 16. The porous ceramic 16 has the same thickness as the cell thickness and is positioned in close proximity to the display electrode 15 and the counter electrode 15' within a cell cavity defined by the two glass substrates. The fact that the ceramics has the same thickness as the cell thickness functions to enhance the mechanical strength of the glass substrates 19 and 17 and to prevent any upward and downward leakage of the display electrode and the counter electrode.

The ceramics used for the ECD cells requires the following properties. The properties include optical density for masking the counter electrode and whiteness for providing greater contrast. Cordierite ($2MgO·2Al_2O_3·5SiO_2$), Mulite ($3Al_2O_3·2SiO_2$) and alumina ($Al_2O_3$), which are useful in the present invention all have sufficient optical density when their thickness is greater than 0.1 mm, and assume a reflection factor of 55–60% for $MgO_2$ standard white color at the wavelength of 590 nm when completely impregnated with an electrolyte within its porous mechanism. Consequently, they are fully effective for the purpose of shielding or concealing the counter electrode. In the above discussed types of the ceramics, an important factor concerning whiteness is the particle size of the starting materials rather than the kind of starting materials. The material particles used in the present invention are 1–6 $\mu$m. The ceramics obtained from these materials manifests excellent whiteness.

Another important property of the ceramic is its electric conductivity when impregnated with an electrolyte. Factors concerning the conductivity are the ratio of porosity and thickness of the ceramics. The conductivity is $0.88 \times 10^{-3}$ MO·CM$^{-1}$ at 25 deg. C when using $LiCl_4$-4-Butyrolactone as the electrolyte, for example. Such degree of the conductivity is required in view of a combination of the electrolyte and the background material. The conductivity of the ceramics impregnated with the electrolyte is increased if the ratio of the porosity is increased, and if the thickness is reduced. However, the ratio of porosity of about 50% is adequate since difficulties associated with the above discussed whiteness and mechanical strength will be experienced if the ratio of porosity is too great. The ceramic should be thicker than 0.1 mm because of an interest in the optical density as stated above. Table 1 sets forth measured results of the above discussed characteristics.

TABLE 1
CHARACTERISTICS OF CERAMICS

| | Thickness (mm) | Ratio of Porosity | Grain Size ($\mu$) | Reflection Factor (%) | Conductivity ($\times 10^{-3}$ cm$^{-1}$) |
|---|---|---|---|---|---|
| TIO2 Pigment | | | | 58 | 7.8 |
| No. 1 Al$_2$O$_3$ | 0.95 | 54 | 10 | 42 | 7.0 |
| No. 2 Al$_2$O$_3$ | 0.1 | 33 | 1-3 | 55 | 8.0 |
| No. 3 Al$_2$O$_3$ | 0.4 | 33 | 1-3 | 58 | 4.7 |
| No. 4 Al$_2$O$_3$ | 0.95 | 37 | 1-3 | 58 | 5.6 |
| No. 5 Al$_2$O$_3$ | 0.5 | 37 | 1-3 | 58 | 7.2 |
| No. 6 Al$_2$O$_3$ | 0.95 | 49 | 4-6 | 58 | 7.6 |
| No. 7 Al$_2$O$_3$ | 1.5 | 49 | 4-6 | 58 | 2.8 |

Conductivity: 25 Deg. C 1KHZ, SINCE-WAVE, IV
Electrolyte: 1.0 M/L LiCl$_5$-R-Butyrolactone
TiO$_2$: 20 Vol % vs electrolyte, thickness 1 mm (U.S. Pat. No. 3,819,252)
Grain Size: Material partical size
Reflection Factor: 590 nm vs MgO$_2$ White In Table 1, the ECD cells using ceramics having a conductivity higher than $6 \times 10^{-3}$ MO·Cm$^{-1}$ show electro-optical characteristics similar to that disclosed in the above referenced U.S. Pat. No. 3,819,252. The ceramics are effective for serving as the background material for the ECD cells.

The manufacture of the porous ceramics used in the present invention will be briefly discussed. As stated above, the starting material having a particle size of about 1-6 $\mu$m is fully mixed with water and polyvinyl alcohol or a binder such as polyethylene glycol, by means of a ball mill, etc. Thereafter, the material is introduced, into a proper metal mold where the material is molded and dried. The resulting material is then sintered into a porous ceramic. The sintering conditions influence greatly the electrical characteristics of the porous ceramics. The coefficient of thermal expansion of the ceramics used for the purpose of the present invention is so extremely low as to make its cubical expansion negligibly small. This is another important feature of the present invention. In other words, a reduction in volume of the electrolyte results in the effect of reducing the coefficient of cubic expansion of the filling materials within the ECD cell. This makes it possible to attain the development of the temperature-proof ECD cell together with utilization of the thin glass substrate as discussed above.

Some specific examples of the ECD cell constructed in accordance with the teachings of the present invention will be set forth together with their response characteristics and temperature-proof characteristics.

EXAMPLE 1

In fabricating the above detailed ECD cell, thin glass films of 0.4 mm thickness (by Matsunami Glass Industry Limited) were employed as the substrates, an aluminum plate (ratio of porosity of 37%, thickness of 0.5 mm) was employed for the ceramics material and a glass sheet of 0.55 mm thickness (by Asahi Glass Company Ltd.) was employed as the spacer member. An electrolyte solution of LiCl$_4$ within R-Butyrolactone with a concentration of 1.0 m/l was vacuum injected into the ECD cell at $-20$ deg. C. The period of time required for attaining a contrast ratio of 10:1 was 0.2 seconds under the measuring conditions of 25 deg. C, an applied voltage of 2 V and a wavelength of 590 NM, certifying that the response characteristics are favorable to the ECD cell. The reflection factor is 58%, showing sufficient whiteness and optically shielding effects as stated above. A temperature cycle test was conducted at from $-20$ deg. C to 80 deg. C with the results that no damage in the resulting ECD cell was found after the elapse of 50 cycles.

EXAMPLE 2

In a similar manner as above, a micro sheet of 0.15 mm thick (by Corning Glass Works), Cordierite (ratio of porosity of 49% and thickness of 0.95 mm) and a glass sheet of 1 mm thick (by Matsunami Glass Industry Limited) were employed as the substrates, the ceramics and the spacer, respectively. In this example, the response is 0.25 second and reflection factor is 60%. The resulting ECD cell passed temperature cycle test of 50 cycles. It was, however, revealed that terminal leading regions for the display electrode and the counter electrode were mechanically weaker. For this reason, an additional glass sheet of the thickness of 0.5-1 mm is required as a means of reinforcing these regions.

EXAMPLE 3

The ECD cell was fabricated by employing glass sheets of 0.55 mm thick (Asahi Glass Company, Ltd.) Mulite (ratio of porosity of 33% and thickness of 0.15 mm) and a Mylar sheet of 0.175 mm thick (Mitsubishi Chemical Industries Ltd). Response of 0.2 seconds and reflection factor of 55% were obtained.

While only certain embodiments of the present invention have been described, it will be apparent to those skilled in the art that various changes and modifications may be made therein without departing from the spirit and scope of the invention as claimed.

What is claimed is:
1. An electrochromic display cell comprising:
   a pair of electrodes,
   a layer of electrochromic material disposed between the pair of electrodes, and
   a sintered porous ceramic material impregnated with an electrolyte and disposed between the pair of electrodes and located in the background of a visual display on the layer of the electrochomic material, said sintered porous ceramic material having a color effective as a display background material in the display cell.

2. An electrochromic display cell as defined in claim 1 wherein the sintered porous ceramic material is selected from the group consisting of Cordierite, Mulite and alumina.

3. An electrochromic display cell as defined in claim 1, wherein the sintered porous ceramic material has a ratio of porosity of 30% to 50%.

4. An electrochromic display cell comprising:
   a pair of electrodes,
   a layer of electrochromic material disposed between the pair of electrodes,
   a sintered porous ceramic material impregnated with an electrolyte and disposed between the pair of electrodes and located in the background of a visual display on the layer of the electrochromic material, said sintered porous ceramic material having a color effective as a display background material in the display cell and a thickness sufficient to provide mechanical strength to the display cell so as to protect the display cell from damage.

5. An electrochromic display cell as defined in claim 4, wherein the sintered porous ceramic material is selected from the group consisting of Cordierite, Mulite and alumina.

6. An electrochromic display cell as defined in claim 4, wherein the thickness of the sintered porous ceramic material is about 1 mm to about 0.1 mm.

7. An electrochromic display cell as defined in claim 4, wherein the sintered porous ceramic material has a ratio of porosity of 30% to 50%.

8. An electrochromic display cell comprising:
a pair of electrodes,
a layer of electrochromic material disposed between the pair of electrodes, and
a sintered porous ceramic material impregnated with an electrolyte and disposed between the pair of electrodes and located in the background of a visual display on the layer of the electrochromic material, said sintered porous ceramic material having a color effective as a display background in the display cell and having a coefficient of thermal expansion sufficient to absorb the cubic expansion of said electrolyte.

9. An electrochromic display cell as defined in claim 8, wherein the sintered porous ceramic material is selected from the group consisting of Cordierite, Mulite and alumina.

10. An electrochromic display cell as defined in claim 8, wherein the thickness of the sintered porous ceramic material is about 1 mm to about 0.1 mm.

11. An electrochromic display cell as defined in claim 8, wherein the sintered porous ceramic material has a ratio of porosity of 30% to 50%.

12. An electrochromic display cell comprising
a first substrate carrying a patterned, transparent, electrically conductive coating and a layer of electrochromic material forming a display electrode,
a second substrate carrying an electrically conductive coating and a layer of electrochromic material forming a counter electrode, said display electrode and said counter electrode defining a cavity therebetween; and
a sintered porous ceramic material impregnated with a desired amount of an electrolyte and disposed in said cavity between said electrodes and located in the background of a visual display on the layer of electrochromic material, said sintered porous ceramic material functioning to absorb the cubic expansion of the electrolyte, having a thickness sufficient to provide mechanical strength to the display cell so as to protect the display cell from damage and having a color effective as a display background material on the display cell.

13. The electrochromic display cell of claim 12, wherein the first and second substrates are glass substrates.

14. An electrochromic display cell as defined in claim 12, wherein the sintered porous ceramic material is selected from the group consisting of Cordierite, Mulite and alumina.

15. An electrochromic display cell as defined in claim 12, wherein the thickness of the sintered porous ceramic material is about 1 mm to about 0.1 mm.

16. An electrochromic display cell as defined in claim 12, wherein the sintered porous ceramic material has a ratio of porosity of 30% to 50%.

17. The electrochromic display cell of claim 13, wherein the electrically conductive coating on the first substrate is selected from the group consisting of $SnO_2$ doped $In_2O_3$ and $AsCl_5$ doped $SnCl_4$.

18. The electrochromic display cell of claim 17, wherein the electrochromic layer on the first substrate is $WO_3$.

19. The electrochromic display cell of claim 18, wherein the electrically conductive coating on the second substrate is selected from the group consisting of a Pt-Pd deposited film, a carbon film, an $In_2O_3$ film, and an $SnO_2$ film.

20. The electrochromic display cell of claim 12, wherein the electrochromic layer on the second substrate is $WO_3$.

21. The electrochromic display cell of claim 12, wherein the porous ceramic material has the same thickness as that of the cavity.

* * * * *